No. 896,574. PATENTED AUG. 18, 1908.
M. RAY.
WATER FILTER.
APPLICATION FILED NOV. 29, 1907.
2 SHEETS—SHEET 2.
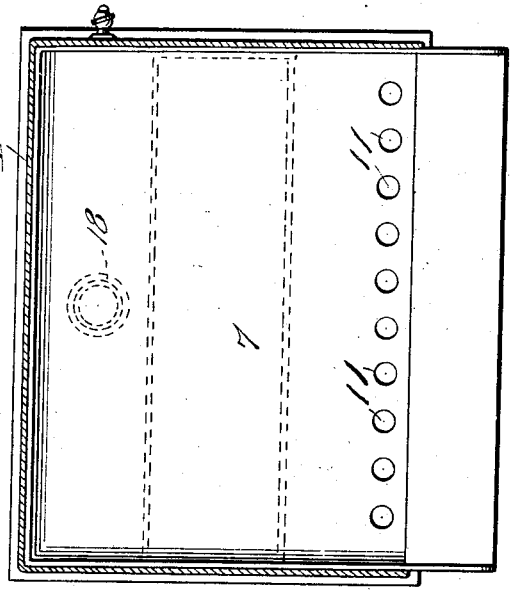
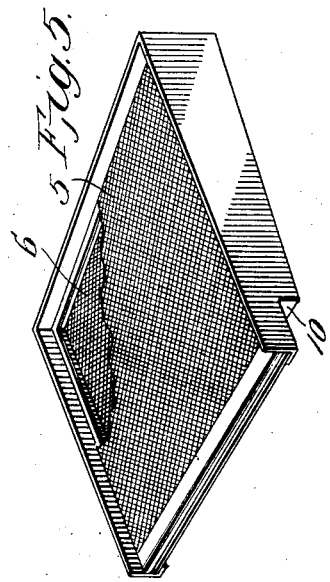
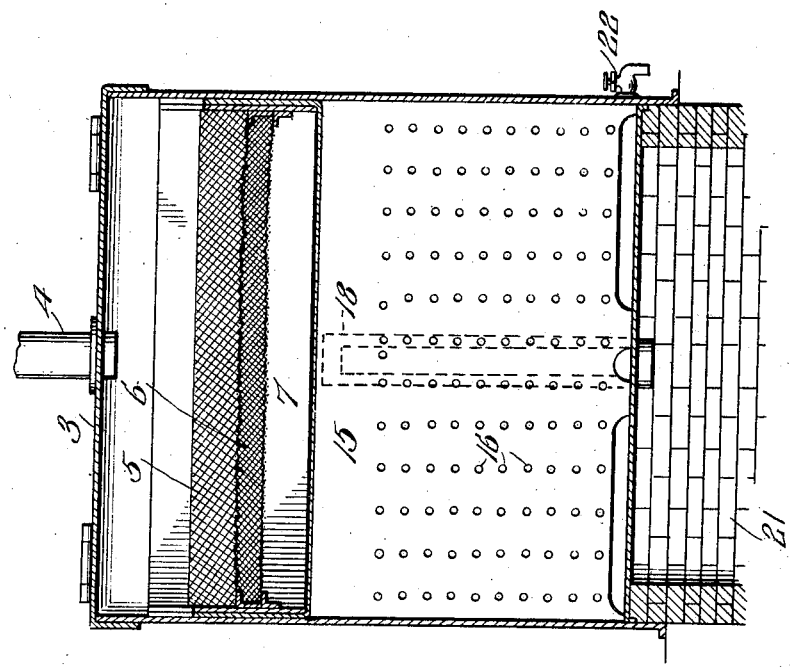
Witnesses
Frank Hough.
P. M. Smith.
Inventor
Michael Ray,
By Victor J. Evans
Attorney

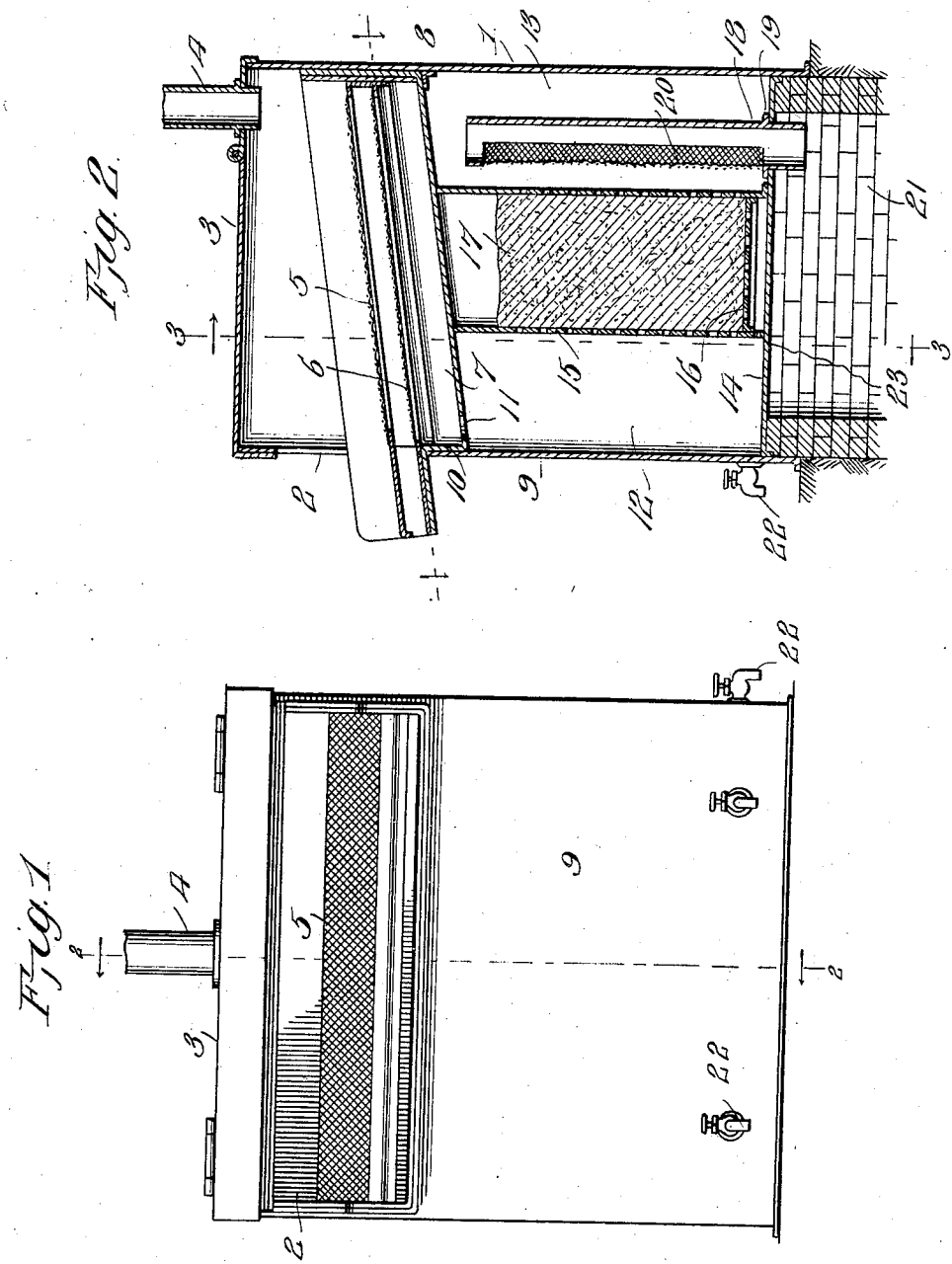

UNITED STATES PATENT OFFICE.

MICHAEL RAY, OF BUCKEYE, KENTUCKY.

WATER-FILTER.

No. 896,574.  Specification of Letters Patent.  Patented Aug. 18, 1908.

Application filed November 29, 1907. Serial No. 404,456.

*To all whom it may concern:*

Be it known that I, MICHAEL RAY, a citizen of the United States, residing at Buckeye, in the county of Garrard and State of Kentucky, have invented new and useful Improvements in Water-Filters, of which the following is a specification.

This invention relates to water filters, the object of the invention being to provide a water filter adapted for domestic use and designed to receive rain water from any suitable source of supply such as the roof of a house and thoroughly strain and filter the same and deliver it to a well for future use.
A further object of the invention is to so construct a filter and the parts thereof that the several parts of the filter may be disconnected from each other for repairs and cleansing purposes and in order to facilitate the renewal of the filtering material.

With the above general object in view, the invention consists in the novel construction, combination and arrangement of parts herein fully described, illustrated and claimed.
In the accompanying drawings:—Figure 1 is a front elevation of a filter embodying the present invention. Fig. 2 is a vertical transverse section through the same. Fig. 3 is a vertical cross section through the filter taken on the line 3—3 of Fig. 2. Fig. 4 is a sectional plan view taken just above the primary screen. Fig. 5 is a detail perspective view of the primary screen and pan.

The general plan and construction of the machine is best illustrated in Fig. 2 wherein the filter is seen to comprise a filter box or casing 1 provided at the front with an opening 2 for the insertion and removal of the primary screen and also embodying a hinged lid or cover 3 for giving access to the interior of the filter box in order to remove and replace the several parts contained therein.

4 designates the inlet which is shown in the form of a pipe adapted to receive the supply of water from any suitable source and conduct the same to the interior of the filter box.

Located in the upper portion of the filter box is a combined screen and pan embodying an upper and relatively coarse screen 5, an underlying finer screen 6, and a pan 7 located beneath both of the screens 5 and 6, the screen and pan being located under the inlet 4 so as to receive the water directly therefrom.
The combined primary screen and pan is of such size as to adapt the same to pass through the opening 2 in the front of the filter box and when in place the said combined screen and pan sets at an inclination with a dip forward, as shown in Fig. 2, the rear end of the pan rests on a ledge or shoulder within the box 1 while the forward portion of the combined screen and pan projects through the openings 2 and rests on the front wall 9 of the box 1, as clearly shown in Fig. 2. The bottom of the pan 7 terminates within the casing 1 and forms a shoulder 10 which rests against the front wall 9 of the box 1, and properly positions the combined screen and pan within the filter box. Adjacent to the shoulder 10 the bottom of the pan is provided with a series of perforations 11 through which the water passes downward into one of a series of vertical chambers located beneath the pan bottom. The initial water receiving chamber 12 of said series is shown as located preferably at the front of the filter box while a similar water chamber 13 is located at the rear of the box, both of said chambers extending from the bottom of the pan 7 downward to the bottom 14 of the filter box.

Interposed between the chambers 12 and 13 is a removable percolation chamber 15 which reaches from the pan bottom 7 to the bottom 14 of the filter box and comprises front and rear perforated sides and also a perforated bottom 16 which is located at a slight elevation above the bottom 14 of the filter box allowing the water from the chamber 12 to flow under the percolation box and into the same in an upward direction. Both the front and rear sides and the bottom of the percolation box are perforated to permit the water to pass into and out of the same and said box is filled with suitable filtering material 17 such as charcoal.

Within the chamber 13 is arranged an outlet 18 preferably in the form of a stand pipe having a flange or shoulder 19 which rests upon the bottom 14 of the filter box. The pipe 18 is cut away at one side and such cut away portion is covered by a finer screen 20 through which the filtered water passes in finding its way into the outlet, the water from the outlet being delivered into a cistern or well indicated at 21. One or more drain cocks 22 may be provided in the filter box 1 and near the bottom thereof for getting rid of sediment contained in the water. The percolation box 15 is provided at the forward side with feet 23 spaced apart to permit the water to flow from the chamber 12 into the space beneath the percolation chamber while the rear wall of the said percolation chamber extends downward to the bottom 14 of the filter box and prevents the water from passing directly into the final chamber 13 thereby forcing water to pass upward through the bottom 16 of the percolation chamber into and through the filtering medium contained therein.

From the foregoing description it will be seen that the combined sieve and pan may be removed from the filter box and cleansed and likewise the percolation box or chamber and the outlet pipe with its screen may be taken out of the filter box, cleansed and replaced. Leaves, dirt and other foreign matter falling upon the upper inclined screen 5 will be washed therefrom by the action of water so that the water finding its way into the cistern is free from all sediment and impurities.

Having thus described the invention, what is claimed, is:—

1. A water filter for cisterns and the like comprising a filter box having a hinged lid and an opening through one side thereof, inlet and outlet orifices, a combined screen and pan set at an inclination within the filter box and removable through the opening therein, and a percolation box forming a dividing wall in the space beneath the combined screen and pan, said percolation box comprising side and bottom walls with the rear wall thereof extending below the bottom and forming a water cut-off.

2. A water filter for cisterns and the like comprising a filter box adapted to be seated over the cistern and provided with inlet and outlet pipes and an opening through one side thereof, a combined screen and pan set at an inclination within the filter box and removable through the opening thereof, a percolation box forming a dividing wall in the space beneath the combined screen and pan, said percolation box comprising perforated side and bottom walls with the rear wall thereof extending below the bottom and forming a water cutoff, the outlet pipe being arranged vertically and provided along one side with a screen, substantially as described.

3. A water filter for cisterns and the like comprising a filter box having a hinged lid and an opening through one side thereof, inlet and outlet orifices, a combined screen and pan set at an inclination within the filter box and removable through the opening therein, a removable percolation chamber extending across the space beneath the combined screen and pan and dividing said space into a plurality of chambers, the said percolation box embodying perforated sides and bottom, and a removable outlet pipe seated in the outlet orifice and embodying a screened wall, substantially as described.

In testimony whereof I affix my signature in presence of two witnesses.

MICHAEL RAY.

Witnesses:
W. E. WHITTAKER,
R. C. BROADDUS.